United States Patent [19]
Danton et al.

[11] 3,801,980
[45] Apr. 2, 1974

[54] SECONDARY RADAR SYSTEM FOR TIME-SHARED TARGET IDENTIFICATION

[75] Inventors: Jacques J. Danton, Versailles; Albert A. Janex, Cachan; Gerard G. Martin-Garin, Fresnes, all of France

[73] Assignee: International Standard Electric Corporation, New York, N.Y.

[22] Filed: Sept. 13, 1972

[21] Appl. No.: 288,784

[30] Foreign Application Priority Data
Sept. 14, 1971 France .............................. 71.33015

[52] U.S. Cl. .......................................... 343/6.5 LC
[51] Int. Cl. ............................................. G01s 9/56
[58] Field of Search ..................... 343/6.5 R, 6.5 LC

[56] References Cited
UNITED STATES PATENTS
3,474,460  10/1969  Huebscher ................... 343/6.5 LC
3,611,379  10/1971  Deckett ..................... 343/6.5 LC X

*Primary Examiner*—T. H. Tubbesing
*Attorney, Agent, or Firm*—W. T. O'Neil

[57] ABSTRACT

An aircraft identification (IFF) system involving ground interrogating stations and multiple airborne transponders. At least one interrogating digital code preceded by a synchronizing pulse sets up a sequence whereby replies are transmitted in the order of their reception at each airborne transmitter. Thus, multiple interrogation can be handled with higher response probability than heretofore. Digital logic is provided for selection of predetermined reply codes and their order and time of transmission from each airborne transponder.

4 Claims, 7 Drawing Figures

S-R Flip-Flop
Fig. 1.

T-Type Flip-Flop
Fig. 2.

T Flip-Flop
W/delay
Fig. 3.

SECONDARY RADAR SYSTEM FOR TIME-SHARED TARGET IDENTIFICATION

CROSS REFERENCE TO RELATED APPLICATIONS

This application is filed under the provisions of 35 U.S.C. 119 with claim for the benefit of the filing of an application covering the same invention filed Sept. 14, 1971, Ser. No. 71 33 015 in France.

BACKGROUND OF THE INVENTION

1. Field of the Invention

The present invention relates to radar systems generally and more specifically to secondary radar systems for target identification.

2. Description of the Prior Art

Secondary radar systems such as those first used for IFF (Identification Friend or Foe) systems, and more recently employed in radio navigation for air traffic control, are now well known as a class of devices. In operation, a ground station transmits an interrogation signal in the form of a pair of pulses, called $P_1$ and $P_3$ for convenience. These pulses are spaced according to a predetermined mode and are carried (for example) on a UHF carrier. Mobile targets are provided with transponders, i.e., equipment which, when illuminated by the said interrogation signal, can recognize the particular interrogation code in a decoder and transmit back (generally on another UHF carrier) a reply signal in the form of a pulse train having a predetermined pulse rate and containing pulses according to a predetermined binary code. After detection of the reply at the ground station, a ground decoder responds to it and the result may be displayed in any of various ways.

Usually, a secondary radar is operatively associated with a primary radar, both being provided with transmission-reception antennae which may be synchronously rotated. Simultaneous use of both primary and secondary radars may result in various combinations of the echoes as, for instance, in juxtaposing their "blips" on a single PPI (Plan Position Indicator).

Typically, in a ground station, replies received from interrogated mobile targets are first sorted so as to eliminate those which are not synchronized with the interrogations. That operation is called "defruiting".

Selected replies are decoded by using devices such as quantized delay lines or shift registers. By interconnection of a delay line and a correlation circuit, it is possible to display targets which correspond to a predetermined reply code in a known way. Such a process is referred to as passive decoding.

The same replies, selected after decoding, may also be exploited in an active decoding arrangement by means of a device which indicates the target echo from the primary radar on the PPI scope and also the identity of the selected target or other data relative thereto.

In air navigation systems, for instance, a typical secondary radar antenna radiation pattern is a fan-shaped vertical-lobe pattern having a horizontal plane beam-width of a few degrees (from 4° to 5°) and covering an elevation sector of about 45°. It is known that a directional antenna creates side-lobes which may cause false indications or identification errors. Therefore, various systems have been designed for suppressing unwanted side-lobes and are called SLS (side lobe suppression) systems. Among the best known SLS systems are those utilizing, in addition to the interrogation signal, a third pulse $P_2$ which is transmitted after $P_1$ and which precludes the transponder from recognizing an interrogation radiated by a side-lobe.

Typically, the time interval between $P_1$ and $P_3$, which determines the interrogation mode, is a multiple $i$ of an elementary duration $\theta_i$, and the pulse $P_2$ is transmitted at a time $j\theta_i$ after $P_1$. Presently, according to international standards, $\theta_i$ is equal to one microsecond and $j$ is equal to 2.

Some systems operate in a mode having time interval, $i = 3$ (mode "1" for military use), and others employ modes having the time interval $i$ as long as 25 (mode D for various uses).

Hereafter, the pulse $P_2$ will sometimes be ignored in the discussion, since it is not considered by the transponder in recognizing an interrogation characterized only by the time interval $P_1 - P_3$.

The width of pulses $P_1$, $P_2$, and $P_3(\theta_i)$ is normally about 0.85 microseconds but may be obviously shorter than that value.

Within the scanned volume of a ground station comprising an assembly of a primary radar and a secondary radar, there may be a great number of moving targets that can be classified into several categories.

In the category O, there are the targets (unequipped aircraft not provided with transponders. These can be handled by primary radar without identification. In the same category, there are targets, though equipped with a transponder, that do not respond to the interrogation modes employed by the primary radar and, consequently, cannot reply. Such targets also may be detected by the primary radar but not identified.

In the category B are targets provided with transponder equipment but which transmit reply codes different from the predetermined recognition code. The ground station receiver-decoder is not able to understand and identify such targets.

Finally, in category A are all transponder-equipped targets which can recognize interrogation from the ground station and transmit a proper reply according to a predetermined code identifiable by the ground station receiver-decoder.

It will be understood that, in a conventional-type IFF system, targets of category A are, as a whole, "friendly" aircraft, and those of categories O and B are "foes" or at least "bogies".

Obviously, it is important to avoid confusion among the categories which could result from incorrect interpretation of a coded reply received by the ground station.

The following analysis is presented to show that present systems are susceptible to such confusions.

Typically, the ground station transmits pulse $P_3$ before pulse $I_P$ (the primary radar pulse), $I_P$ being delayed with respect to $P_3$ by a few microseconds, that delay being precisely determined and held constant because $P_3$ serves as a time reference. Interrogation, and thus $I_s$, (recurrence period $T_s$) is of about one millisecond duration. The range of the primary radar and of the interrogator, as it is well known, is necessarily less than the value $D_m = 150\ T_s$ ($D_m$ being measured in meters and $T_s$ in microseconds). For some radars (i.e., certain MTI radars), that range is often limited to 75 $T_s$ due to ground station receiver blocking during the time $T_s/2$ which precedes radiation of pulse $P_3$.

Coded transponder replies generally consist of a pulse train located between the two frame pulses $F_1$ and $F_2$ which are always present in the reply signal and separated by a predetermined time interval $T_u$ of a few microseconds. If two mobile targets receive and recognize the same interrogation, each one will transmit a coded reply toward the ground station. The ground station can only discriminate between the two replies and thus identify the targets if pulse $F_1$ from the farthest target reaches the ground station after the pulse $F_2$ from the nearest target. In other words, reply overlapping may occur if the difference $d_r$ of ranges from the ground station to the targets is such that $d_r \leq 150\ T_u$ (formula 1) ($d_r$ being measured in meters and $T_u$ in microseconds). Difference $d_r$ measures the capacity for discrimination which is the better when $d_r$ is smaller.

In certain applications of secondary radar when the density of mobile targets under surveillance is high, overlapping risks are important and the above-mentioned confusion poses distinct dangers.

Generally speaking, if the useful aperture of the main rotating beam is $\alpha°$ for a given position of that beam, all the category- A targets located in circular annulus sectors of angle aperture, and radial dimension $d_r$ cannot inherently be separately identified by the ground station receiver-decoder and may be considered as belonging to categories O or B depending on the control arrangement in the ground station. In the following description, such circular annulus sectors will be called "non-identification areas".

The manner in which the present invention solves the aforementioned prior art problems will be understood as this description proceeds.

SUMMARY OF THE INVENTION

It is a purpose of the present invention to provide, on the one hand, modified interrogation sequences and, on the other hand, changes in transponders which enable them to recognize these modified interrogations and to transmit appropriate replies. The new interrogation sequences and transponders operate, in most cases, to avoid overlapping replies and make it possible to achieve greatly improved discrimination or, in the most unfavorable cases, to statistically obtain discrimination better than that defined by the formula 1.

According to the invention, the transponders are provided with auxiliary encoding means which allow encoding the moment replies are triggered and to place them at different times.

Several targets located in a non-identification area, but characterized by different auxiliary codings, will transmit replies to the same interrogation mode at times different enough for elimination of overlappings.

According to a feature of this invention, the secondary radar cyclically transmits sequences of (either standardized or not) $1 + N + M$ interrogations whose pulses $P_3$ are separated from each other by time $T_s$. The first interrogation, called synchronization interrogation, comprises, in addition to the pulses ($P_3$), one or several pulses ($P_1$) which permits sorting from standardized interrogations, the N following interrogations each comprising both significant pulses $P_1$, $P_3$ for one of the C agreed interrogation modes that transponders of the system can recognize. The M final interrogations (M being possibly zero) correspond to standardized interrogation modes other than the C predetermined interrogation mode which permits the secondary radar system to be compatible. In other words, the utility for recognition of targets other than those which are provided with transponders replying to interrogations in the C agreed modes is increased.

According to another feature of this invention, the transponder of each category- A target is provided with:

1. decoding means for separately recognizing synchronization interrogations for each of the C agreed modes;
2. generating means for generating a signal for transmission of the first reply pulse, called a synchronization reply pulse, after a time $t_a$ which follows the reception of the synchronization interrogation pulse $P_3$;
3. triggering means for triggering C N-stage counters, each corresponding to one of the C agreed-upon (predetermined) interrogation modes, as soon as synchronization interrogation is recognized and causing it to count recognized predetermined interrogation mode interrogations up to $p$, $p$ being a code number between 1 and N inclusive which identifies the target;
4. and generating means for generating a signal producing transmission of the first pulse of the reply to the $p^{th}$ interrogation of one of the agreed modes after a time $t_a$ which follows the reception of the pulse $P_3$ of the said $p^{th}$ interrogation.

It is known that, ordinarily, the $2^m$ possible coded replies for a transponder consist of $0-m$ pulses which may be placed at the m equal intervals between the two pulses $F_1$ and $F_2$. The reply specific to the synchronization interrogation may, for instance, comprise two pulses, one confused with $F_1$ and the other $F'_2$ located beyond $F_2$.

According to a feature of a preferred embodiment of this invention, N is equal to $2^n$, and the coded reply to an agreed interrogation is identical to the code number $p$ identifying the target.

If, for instance, $N = 16$, the coded reply will include at least the two pulses $F_1$ and $F_2$ and a maximum of other pulses (six altogether).

Time intervals between pulses being conventionally 1.45 microseconds and pulse width being 0.45 microseconds, the duration of the reply to an interrogation of one of the C agreed modes will thus be 7.70 microseconds, and the duration of the specific reply to the synchronization interrogation will be 9.15 microseconds.

Therefore, it is to be noted that the non-identification area would have a width $d_r$ of 1,200 meters, without the device according to this invention.

Thus, it appears that a number of category - A targets in a non-identification area can be perfectly identified if they are given different auxiliary codes in accordance with the invention. Mostly, the number N of interrogations will be selected equal to the number N of possible reply codes. In this manner, the rank ($p$) of an interrogation will be identified with the code identifying the target.

To appreciate the advantages provided by the system, according to the invention, consider the case of a secondary radar surveying a number S of mobile category- A targets whose transponders are each provided with auxiliary encoding means enabling them to reply only to the second interrogation or to the third or fourth and so on up to the $(N+1)^{th}$ interrogation cycle. It is assumed that the N auxiliary codes are regularly shared between the S mobile targets when S is high. Under these circumstances, the probability of having two targets, which have been given the same auxiliary code inside a non-identification area that is null when $S \leq N$, tends, toward 1/N when S is very large. The probability of having three targets which have been given the same auxiliary code (that is null when $S \leq 2N$), tends to $1/N^2$ when S is very large.

Various transponder designs are extant, including designs for interrogation decoding circuits; - delay circuits providing a well determined delay time $t_a$ from pulses $P_3$ received and belonging to recognized interrogations; and circuits for generating pulse trains as replies whose first pulse $F_1$ is synchronized by received pulse $P_3$ delayed by the time $t_a$.

Particularly, an embodiment of a transponder is described in Italian patent No. 924, 141, entitled, "Transponder With Internal-Delay Stabilizing Device", and in U.S. Pat. No. 3,721,906.

In the previously known transponders, turn-on of delay circuit $t_a$ was effected by a mode selection signal (interrogation recognition signal).

According to a feature of this invention used in a preferred embodiment thereof, said delay circuit turn-on is caused, either by a synchronization interrogation recognition signal or by the recognition signal for the $p^{th}$ interrogation of one of the C agreed modes delivered from the output of the N-digit counter associated with the corresponding mode.

It is noted that a given transponder may, sometimes in the time $T_s$, be interrogated by several secondary radar ground stations. To avoid confusion, it is then necessary, after having recognized an interrogation, to dispatch it according to its chronological rank (of occurrence) within time $T_s$ on several channels (e.g., $g$ channels) each including means to yield reply triggering in response to synchronization interrogations and, for each of the C agreed modes, N-digit counting means and triggering means for transmitting reply to the $p^{th}$ interrogation.

According to a feature of this dispatching process, a $(g+1)$-digit counter, reset by the leading edge of a clock pulse of period $T_s$, counts the interrogation recognition pulses occurring during the time $T_s$ which follows. It delivers signals which selectively and successively mark the first channel, the second channel and so on, up to the $g^{th}$ channel, and finally triggers an alarm signal at the $(g+1)^{th}$ pulse.

In secondary radar systems, it is necessary that the return-to-the-ground station of one of the edges of one of the pulses of the pulse train of the reply to the interrogation coincide (within a very small tolerance) with the echo from the target as received by the primary radar. Among the pulses of the reply train, the pulse $F_1$ is selected, i.e., the first pulse and, depending on the particular installation, its leading or trailing edge. Likely, in the ground station interrogator, it is one of the edges of the pulse $P_3$ which is selected as the time reference, and that edge has to be transmitted at a very precise time $T_a$ before (for instance) occurrence of the leading edge of the synchronization square pulse of period $T_s$ which controls the generation of pulses $I_s$ transmitted by the primary radar. It is necessary to provide an advance time $T_a$ for taking into account the duration of data processing operations inside the transponder ($t_a$) and the duration of reply decoding operations in the ground station. Typically, the edge of $P_3$ does not appear at time $T_a$ preceding the synchronization pulse leading edge but at time $T_s/2 - T_a$ which follows the synchronization pulse trailing edge.

In addition, it will be noted that, taking into account the time interval between the pulses $P_1-P_3$, the delay to be introduced into the system is not $T_s/2-T_a$ but $T_r = T_s/2 - (\delta + T_a)$, $\delta$ being a duration longer than the time interval $P_1 - P_3$ of the widest interrogation pulse separation that the ground station may transmit.

The above shows the occurrence times of selected edges of $F_1$ and $P_3$ and the delay $T_r$ must be established with a high degree of precision. That precision can be provided by a high frequency clock of period $\theta_h$, a small period compared to $\theta_i$.

Those considerations being taken into account, according to a feature of an embodiment of the interrogation coder, the generator of the $q$ successive intervals having a width $\theta_i$, wherein interrogation pulses $P_1$, $P_3$ and accessorily $P_2$ may be located, comprises: a clock period $\theta_h$; a divider-by-$v$ of the clock frequency with $v = \theta_i/\theta_h$, provided with two outputs, one called calibrating output and the other pulse output, with one input to reset in the condition O and with another input which receives pulses from the said clock; means to free the O condition resetting input by the synchronization pulse trailing edge; a first synchronous $m$-digit counter, whose input is connected to the divider pulse output, which introduces a delay $m$ $\theta_i$ between its input and its output and which is provided with means connected to its output for triggering a first signal at the end of the count, the said first signal releasing an interrogation transmission inhibiting gate; a second synchronous $q$-digit counter having $r$ outputs, $q$ being equal to $\theta_h/\theta_i$, and being provided with a O condition resetting input released by the first signal, and with a count input connected to the divider pulse output; and means connected to the $r$ outputs of the second counter for triggering a second signal at the end of the count, the said second signal turning off the resetting input of the divider and the interrogation transmission inhibiting gate.

Depending on the selection of the divider pulse output, it is possible to introduce a delay $w$ $\theta_h$ between the condition change times of the divider input, which receives the clock pulses, and of the said pulse output, $w$ being between 0 and $v - 1$.

Therefore, the delay $T_r$ is:

$T_r = w\theta_h + m\theta_i = (w + m\ v)\ \theta_h.$

Thus, it is really determined to a tolerance of one $\theta_h$ period.

The selection of the calibrating output makes it possible to adjust the width of the transmitted interrogation pulses.

According to processes very similar to those described in the aforementioned Italian Patent No. 924,141, the pulses, that are counted in the second counter, are used in the said interrogation coder.

According to another feature of an embodiment of this invention wherein $M = 1$, the said coder includes: $(2 + C)$ encoding memories, each constituted by $2^r$ separate elements and containing the $q$ digits of the binary number which characterizes one of the $(2 + C)$ coded interrogations which the interrogator can transmit; three primary selection devices for encoding memories, which are controlled by a third synchronous (2+N)-digit counter, which counts the radar synchronization pulses from a trailing edge, the first said device selecting the synchronous interrogation mode, the second said device selecting one of the C agreed modes and operating during a time $NT_s$, the third said device selecting a standard interrogation mode other than one of the C agreed modes; a secondary selection device which, from the second primary selection device, selects one of the C modes by manual or automatic means; a multiplexer-type reading device having $r$ addressing inputs, each being connected to one of the $r$ second synchronous counter outputs, having $2^r$ data storage inputs connected to the $2^r$ selected encoding memory outputs and having an output; and a three-input gate having the first input connected to the interrogation transmission inhibition gate, the second one to the multiplexer output, the third one to the divider-by-$v$ calibrating output.

Each time the three inputs of that gate are marked with the same digit 0 or 1, it delivers a pulse of the selected interrogation.

In certain applications, it is necessary to inhibit reception of replies in the ground station during the time $T_s/2$, starting $T_s/2$ after transmission of the interrogation pulse $P_3$.

That result is obtained by switching (on or off) a reception gating pulse controlled by the generating device counting $q$ successive encoding time intervals for the interrogation encoder.

According to a feature of this invention, the said device makes two countings during a period $T_s$, the divider-by-$v$ inhibition gate being turned on at the first time by the synchronization pulse trailing edge and at the second time by the synchronization pulse leading edge, means inhibiting during the second counting the interrogation transmission gate. A symmetric flip-flop having a delay input set to 1 by the radar synchronization pulse leading edge and to 0 by the radar synchronization pulse trailing edge, successively receives at its pulse input, separated by intervals $T_s/2$, the second signals from the second $q$-digit counter and thus changes its condition at each interval $T_s/2$, one condition turning the gating pulse on, and the other turning it off.

Other features of this invention will appear more clearly from the hereinafter provided description of an embodiment, the said description being made in conjunction with the accompanying drawings.

DESCRIPTION OF THE PREFERRED EMBODIMENTS

There are now available in the electronic arts a great number of logic circuits, each having more or less complex functions or embodying logic characteristics. Those circuits, including those consisting of TTL-type integrated circuits, are well known to those skilled in the art.

Figure 1:
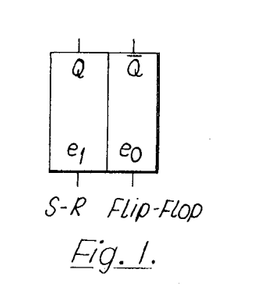
FIGS. 1-5 illustrate symbols for a number of logic circuits which are used in the system diagrams herein.

One of those basic logic circuits, which will be used in the description, is the S-R type flip-flop. Conventionally, an S-R flip-flop, operating as a binary memory, will be illustrated as shown in the FIG. 1. An S-R flip-flop has two inputs, i.e., a set input and a reset input, which are respectively denoted $e_1$ and $e_o$, and two outputs, which are always complementary and denoted Q and $\overline{Q}$. A pulse applied to $e_1$ turns the output Q to the logic condition 1 which is stored until another pulse is applied to input $e_o$.

Figure 2:
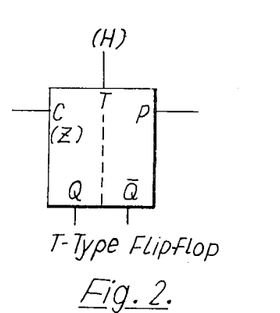

Another flip-flop widely used in logic systems is a T-type flip-flop shown in the FIG. 2. A T flip-flop has only one input, denoted T or H, and has two outputs, Q and its complement $\overline{Q}$. A T flip-flop changes its condition each time a trailing edge, either of a pulse or of condition change from 1 to 0, is applied to input H. A T flip-flop may be provided with additional inputs, particularly with inputs C and P which permit setting of the flip-flop to condition 0 or to condition 1 and which inhibit any further condition change as long as a signal 0 is applied to one of them. A pulse applied to input C (Z) may be used to reset the flip-flop.

Figure 3:
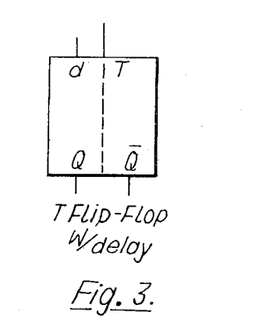

Certain T flip-flops are provided, as shown in the FIG. 3, with an input $d$ (meaning delay). The signal applied to input $d$ presets the condition of output Q when a pulse is applied to input T.

More complex circuits, which will be further described hereafter, such as shift-registers, synchronous counters and dividers-by-N ($2^{n-1}<N \leq 2^n$), consist of cascaded T flip-flops coupled to each other by logic gates according to various well known processes. In those complex circuits, it will be assumed that there is real access to the $n$ Q and the $n\overline{Q}$ outputs. In a counter, such as the one shown in the FIG. 4, it is to be noted that there are four pairs of outputs Q and $\overline{Q}$ which are denoted A, B, C and D. The number stored in the counter is in binary code DCBA, the four letters being replaced by signal 0 or 1 of the corresponding outputs Q.

Figure 4:
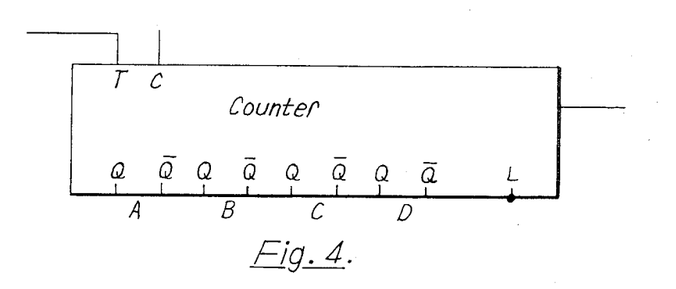

Inputs T (or H) and C (or Z) are shown once for the assembly of four flip-flops. Depending on the internal arrangement of the counter, the value of N may be between 9 and 16.

Preset synchronous counters which are provided with an additional input L will also be used. A pulse applied to that input L resets the counter to the initially preset value $N_o$. Thus, pulses applied to input T are counted up to $N-N_o$.

Synchronous counters or dividers which belong to the "Johnson Counter" type will also be used. The latter is a counter whose one output Q changes its condition for each new pulse to be counted.

Figure 5:
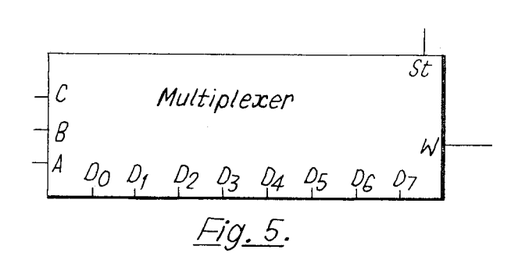

Lastly, integrated circuits, called "multiplexers" are used and will be seen as the description proceeds. A multiplexer, as shown in FIG. 5, is an AND-OR-NOT logic unit having a plurality of inputs and one output. Such a circuit is described in an article by J. M. Krausener in the review, "Electronique Industrielle", April 1970, Pages 219-224. The multiplexer of FIG. 5 has, for instance, 8 data storage inputs $D_o$-$D_7$, an inhibition input $St$, and three binary selection inputs A, B and C. When a signal 0 is applied to input $St$, output W of the multiplexer delivers the complement of the data selected by the combination A, B and C. This enables, by successively addressing the multiplexer storage inputs by means of a binary counter controlled by an encoding clock, the multiplexer output to deliver complements of data which have been applied to storage inputs D. Thus, it is possible to convert parallel data into a serial message.

Figure 6:
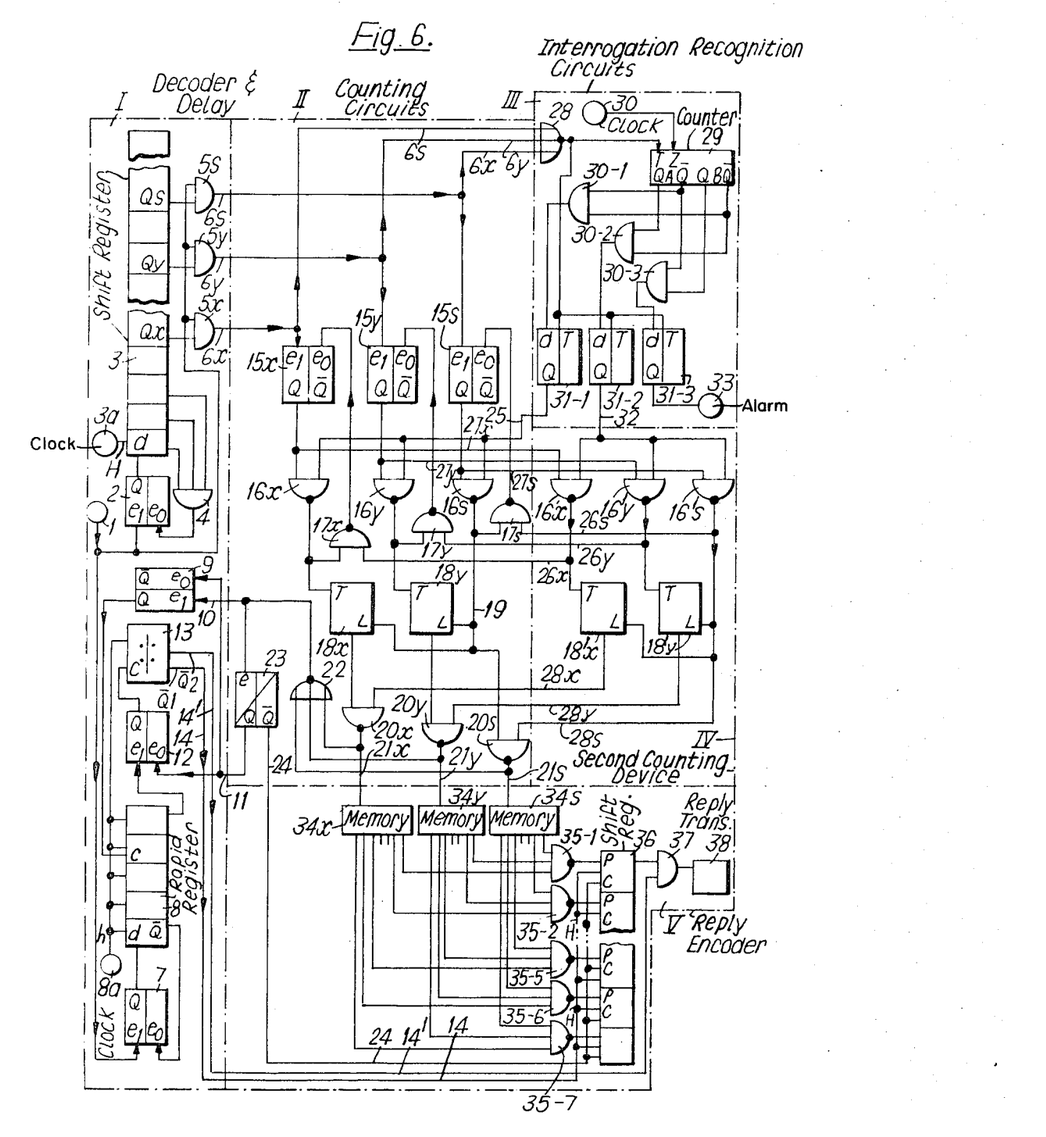
FIG. 6 is a schematic diagram of a decoder-encoder assembly for a transponder according to this invention.

FIG. 6 shows the decoder and encoder parts of a transponder according to this invention.

FIG. 6 comprises 5 sub-units defined by dotted lines on the drawing.

In the box I, there is the said decoder and a delay system for the second pulse of the recognized interrogations, similar to the circuits, for instance, described in Italian Patent No. 924,141, hereinbefore mentioned.

The box II basically includes the counting device which permits counting of recognized mode interrogations and triggering of the clear reply pulse when the predetermined (agreed) code number has been reached.

Group (Box) III includes a device for dispatching recognized mode interrogations from several ground stations.

Group (Box) IV includes a second counting device for mode interrogations used in the case of contemporaneous reception of interrogations from two ground stations.

Group (Box) V includes an encoding device for reply generation and is similar to the circuit, for instance, described in the Italian Patent above referenced.

In Box I of FIG. 6, pulses detected in a receiver (not shown) are applied to input 1. The useful signal, as expected in 1, will be in the form of pairs of pulses separated by time intervals of a few microseconds which characterize the interrogation modes convenient for the specific application considered. Presently, it will be assumed that there are three modes, e.g., the synchronization mode denoted by $M_s$ and two other C modes, respectively denoted by $M_x$ and $M_y$.

Input 1 is connected to input $e_i$ of flip-flop 2 whose Q output is connected to pulse input d of a shift register 3 performing the function of a quantized delay line including a certain number of stages and controlled by a clock 3a. Each Q output of the three first stages of 3 is connected to one input of AND gate 4 whose output is connected to input $e_o$ of flip-flop 2. That arrangement determines the width of the pulse to be shifted in register 6. In addition to the three first Q outputs of 3, those outputs $Q_s$, $Q_x$ and $Q_y$ are shown which correspond respectively to the three interrogation modes which the decoder can recognize.

Outputs $Q_s$, $Q_x$ and $Q_y$ are each connected to one of the two inputs of an interrogation detection AND gate, i.e., respectively $5_s$, $5_x$ and $5_y$. Each second input of $5_s$, $5_x$ and $5_y$ is connected to input 1. Outputs of $5_s$, $5_x$ and $5_y$ are connected to leads $6_s$, $6_x$ and $6_y$ toward Box II.

Input 1 is also connected to input $e_1$ of flip-flop 7 whose Q output is connected to input d of the first stage of a so-called "rapid" register 8 controlled by a high frequency clock 8a of period $\theta a$. Output $\overline{Q}$ of the first stage of 8 is connected to input $e_o$ of 7, that arrangement making it possible to determine the pulse width (at most equal to $\theta a$) for the pulse which is to be shifted in 8 at the frequency of the clock 8a. One of the first stages of 8 is provided with a reset input C, which normally is at level 0, which inhibits pulse shifts. Input C of 8 is connected to output Q of flip-flop 9 whose inputs $e_1$ and $e_o$ are respectively connected to leads 10 and 11 from Box II.

The output of the last stage of 8 is connected to input $e_1$ of flip-flop 12, whose input $e_o$ is connected to a branch of lead 11. Output Q of 12 is connected to reset inputs C of divider-by-$k$ 13 which is, for instance, a Johnson counter operated and controlled by clock 8a.

Output $\overline{Q}_1$ of 13 is connected to lead 14 to Box V.

Another output $\overline{Q}_2$ of 13 is connected to lead 14' which also enters Box V.

The time interval separating switching from 1 to 0 of output $\overline{Q}_1$ and switching from 1 to 0 of output $\overline{Q}_2$ is a multiple 1 of $\theta_a$ as will be hereafter explained. $\theta_a$ defines the width of the coded reply train pulses. When divider 13 is operating, i.e., when its inputs C are receiving logic signal 1, the leading edge of the first pulse from output $\overline{Q}_1$ is delayed by a time interval $t_a$ with respect to the leading edge of the pulse from input 1. That time interval $t_a$ is a known multiple of $\theta_a$, that is, the internal transponder delay. Pulses flowing through lead 14 have a period $k\theta_a$.

A summary explanation of operations of circuits enclosed in Box I, FIG. 6 will now be given.

When a pulse is applied to input 1, after having been converted in circuit 2 and 4, it flows through register 3 and reaches outputs $Q_x$, $Q_y$ and $Q_s$, respectively, characterizing modes $M_x$, $M_y$ and $M_s$. If, at the time pulse $P_1$ reaches one of those outputs, for instance, pulse $P_1$ of mode $M_x$ reaching output $Q_x$, the second pulse $P_3$ of the same mode is applied to input 1, AND gate $5_x$ is turned on, and an interrogation recognition pulse flows along lead $6_x$.

The delay device constituted by assembly 7, 8, 12 and 13 also receives all pulses applied to 1, but they flow in rapid register 8 only if input C thereof is marked by a logic signal 1.

So it is when output Q of flip-flop 9 has been turned to level 1 as a result of a pulse applied to its input $e_1$ via lead 10 from Box II. In advance of describing operation of Box II, it may be stated that register 8 is turned on when the circuits of Box II have transmitted a signal coding a reply to an interrogation. For that condition, a pulse applied to 1 corresponds to a detected interrogation pulse $P_3$ whose leading edge, serving as time reference, enters register 8, flows through it and changes the condition of flip-flop 12, which in turn permits divider 13 to operate. After time interval $t_a$, following occurrence of leading edge of $P_3$, a pulse is applied to lead 14. This is the first pulse of a pulse train of period $k\theta_a$ which is used for synchronizing reply coder operation in Box V.

After the end of the reply transmission, a signal from Box V via lead 11 resets outputs Q of flip-flops 9 and 12 inhibiting again operation of register 8 and divider 13.

In Box II of FIG. 6, $6_x$, $6_y$ and $6_s$ from Box I are respectively connected to inputs $e_1$ of three flip-flops $15_x$, $15_y$ and $15_s$ whose outputs Q are each respectively connected to an input of three two-input NAND gates $16_x$, $16_y$ and $16_s$. The three outputs of $16_x$, $16_y$ and $16_s$ are respectively connected to an input of three two-input NAND gates $17_x$, $17_y$ and $17_s$ whose outputs are connected to inputs $e_o$ of corresponding flip-flops $15_x$, $15_y$ and $15_s$.

Outputs from $16_x$ and $16_y$ are also respectively connected to inputs T of preset counters-by-N $18_x$ and $18_y$; the initial figure preset in $18_x$ and $18_y$ is equal to N-$p$, $p$ being the code number which characterizes the transponder. Branches of lead 19 connected to the output of $16_s$ are coupled to preset inputs L of $18_x$ and $18_y$. Outputs of $18_x$, of $18_y$ and lead 19 are respectively connected to an input of the three two-input NAND gates $20_x$, $20_y$ and $20_s$.

Outputs of $20_x$, $20_y$ and $20_s$ are respectively connected to leads $21_x$, $21_y$ and $21_s$ toward encoding Box V.

Branches of $21_x$, $21_y$ and $21_s$ are connected to inputs of a NOR gate 22 whose output is connected, on the one hand, to lead 10 entering Box I and, on the other hand, to input e of a monostable flip-flop 23 which introduces a delay slightly longer than the total of time $t_a$. The duration of said delay is equal to the longest of the replies from Box V. Output Q of 23 is connected to lead 11 entering Box I and output $\overline{Q}$ of 23 is connected to lead 24 entering Box V.

The second inputs of NAND gates $16_x$, $16_y$ and $16_s$ are connected together to lead 25 from Box III. Similarly, the second inputs of NAND gates $17_x$, $17_y$ and $17_s$ are respectively connected to leads $26_x$, $26_y$ and $26_s$ from Box IV.

If the transponder is to be interrogated by only one ground station, i.e., when Boxes III and IV are missing, leads 25, $26_x$, $26_y$ and $26_s$ must be at level 1.

If Boxes III and IV are used, outputs Q of flip-flops $15_x$, $15_y$ and $15_s$ are respectively connected to leads $27_x$, $27_y$ and $27_s$ entering Box IV. For the same condition, the second inputs of NAND gates $20_x$, $20_y$ and $20_s$ are respectively connected to leads $28_x$, $28_y$ and $28_s$ from Box IV.

The operation of circuits of Box II, FIG. 6, which constitute an important feature of this invention, will now be described.

When an interrogation, for instance, corresponding to mode $M_s$, is recognized by the decoder of Box I, a condition change of the output of AND gate $5_s$ from 0 to 1 is transmitted via lead $6_s$ to input $e_1$ of flip-flop $15_s$ whose output is turned to condition 1. NAND gate $16_s$ is turned off and condition 0 is transmitted via lead 19 to inputs L of preset counters $18_x$ and $18_y$, wherein initial preset number $N-p$ has been inserted. At the same time, via a branch of lead 19, condition 0 reaches input of NAND gate $20_s$ which is turned on to send condition 1 via lead $21_s$ to Box V which allows interrogation of mode $M_s$ to be replied. Output 1 of $20_s$ turns NOR gate 22 off whose output 0 changes, via lead 10, the condition of flip-flop 9, Box I. Thus, pulse $P_3$ of recognized mode-$M_s$ interrogation may pass through assembly 8, 12 and 13 of Box I, and after a time duration $t_a$, the first pulse reply to mode-$M_s$ interrogation is transmitted by Box V. After a suitable time, as hereabove described, via monostable flip-flop 23 whose input is also connected to output of 22, operation of assembly 8, 12 and 13 is inhibited again. Output Q of flip-flop $15_s$ is reset as soon as output 0 occurs from $16_s$, because that output 0 inhibits NAND gate $17_s$ whose output is connected to input $e_0$ of $15_s$.

When, for instance, the first interrogation of mode $M_x$, which follows interrogation of mode $M_s$, is recognized by the decoder of Box I, an output condition change of AND gate $5_x$ turns, via $6_x$, the condition of flip-flop $15_x$. NAND gate $16_x$ is turned off and output 0 thereof is transmitted to counter $18_x$, wherein the number $(n - p + 1)$ is inserted. If the code-$p$ number of the transponder is not equal to 1, there is no output from $18_x$ and no encoding authorization sent toward Box V; and similarly, assembly 8, 12, 13 of Box I remains inoperative.

According to the already described method, via gate $17_x$, flip-flop $15_x$ is reset a short time after output of $16_x$ has changed its condition.

When the second interrogation of that mode $M_x$, which follows interrogation of mode $M_s$, is recognized in the same manner, the number $N - p + 2$ is inserted into counter $18_x$ and if code-$p$ number is not equal to 2, nothing yet occurs at the output of $18_x$.

It is only when the $p^{th}$ interrogation of mode $M_x$ has been recognized that the output of counter $18_x$ turns its condition enabling NAND gate $20_x$ to turn on resulting in condition 1 transmitted via wire $21_x$ into Box V, which permits the reply to the $p^{th}$ interrogation of mode $M_x$ following interrogation of mode $M_s$.

It will be noted that, under those conditions, assembly 8, 12 and 13 becomes operative as has already been described in relation with recognition of mode $M_s$.

Of course, the method would be the same if interrogations of mode $M_y$ are to be replied to. Elements $6_y$, $15_y$, $16_y$, $18_y$, $20_y$ and $21_y$ operate for that case instead of similar items with $x$ subscript.

Up to now, it has been assumed that mode $M_s$ was represented as other modes by two significant pulses $P_1$ and $P_3$.

If there is any possibility of confusing that mode $M_s$ with a standard mode, it is preferable to make mode $M_s$ of three significant pulses: $P_1$, $P'_1$ and $P_3$, $P_1$ being the first pulse of the widest predetermined mode ($M_y$) and $P'_1$ the first pulse of the narrowest mode ($M_x$). For those conditions, recognition of each of the modes $M_s$, $M_x$ and $M_y$ will be obtained by means of AND gates $5_s$, $5_x$ and $5_y$ having three inputs instead of two. One input of each such gate is connected to input 1, Box I; the two inputs of $5_s$ being respectively connected to outputs $Q_x$ and $Q_y$ of register 3, Box I. The two other inputs of $5_x$ are respectively connected to $Q_x$ and $Q_y$; and finally, the two other inputs of $5_y$ are respectively connected to outputs $Q_y$ and $Q_x$. Thus, each gate 5 is precluded from being turned on by an interrogation other than that corresponding to it.

BOX III of FIG. 6 is utilized for dispatching recognized mode interrogations toward processing circuits similar to those of Box II, when the said interrogations may be received from several ground stations.

NOR gate 28 has three inputs receiving, via leads $6_s$, $6_x$ and $6_y$, interrogation recognition pulses. The output of 28 is connected to pulse input T of counter-by-four 29. Clock 30 provides pulses having a repetition period equal to that of central station synchronization signals which control interrogation generation. Clock 30 is connected to input Z of counter 29. Outputs $\overline{Q}_A$ and $\overline{Q}_B$ of 29 are respectively connected to two inputs of AND gate 30–1; outputs $Q_A$ and $\overline{Q}_B$ of 29 are respectively connected to two inputs of AND gate 30–2; and outputs $\overline{Q}_A$ and $Q_B$ of 29 are respectively connected to two inputs of AND gate 30–3.

Outputs of 30–1, 30–2 and 30–3 are respectively connected to inputs $d$ of three T flip-flops 31–1, 31–2 and 31–3 whose inputs T are supplied with pulses from the output of 28.

Output Q of 31–1 is connected to lead 25 entering Box II; output Q of 31–2 is connected to lead 32 entering Box IV; and output Q of 31–3 is connected to an alarm device 33 which is triggered when output Q turns to condition 1.

The circuits of Box III operate as follows: Counter 29 is reset by the trailing edge of a pulse from clock 30. Considering output conditions of 29 after such operation, gate 30-1 is on, while 30-2 and 30-3 are off. Input d of 31-1 is 1, while inputs of 31-2 and 31-3 are 0.

The first interrogation recognition pulse from the output of 28 then turns outputs Q of 31-1, 31-2 and 31-3, respectively, to 1, 0 and 0. When outputs of counter 29 change their conditions, gate 30-2 is turned on while 30-1 is turned off and 30-3 remains off. Inputs d of 31-1, 31-2 and 31-3 are then respectively 0, 1 and 0.

The second interrogation recognition pulse, if any, from output 28, within a time interval shorter than $T_s$ after the reset operation, turns outputs Q of 31-1, 31-2 and 31-3 to conditions 0, 1 and 0, respectively. When the outputs of counter 29 change their conditions, gate 30-3 is turned on while 30-2 is turned off and 30-1 remains off. Inputs d of 31-1, 31-2 and 31-3 are then respectively 0, 0 and 1.

If a third interrogation recognition pulse is delivered from the output of 28 within a time interval shorter than $T_s$ after reset operation, it turns outputs Q of 31-1, 31-2 and 31-3 respectively to conditions 0, 0 and 1. In such an event, alarm device 33 is triggered on.

Anyway, counter 29 is reset when time $T_s$ elapses by occurrence of a next pulse trailing edge from clock 30.

Therefore, it is to be understood that, due to that device, the first recognized interrogation within a time duration $T_s$ is processed in circuits of Box II, the second one is processed in circuits of hereafter described Box IV, and the third one triggers an alarm.

It is to be noted that the assembly of flip-flops 31-1, 31-2 and 31-3 performs as a shift register, pulses from the output of 28 causing the shifting of condition 1 from the left to the right.

Also to be noted regarding operation is the fact that, if one of the central ground stations interrupts transmission — for instance, the one corresponding to Box II — interrogations from the other central ground station which were counted in Box IV will be then processed in Box II. Although disturbed results, adjustment takes place in a time no longer than $(N + 2) T_s$ which typically causes no difficulty.

Box IV of FIG. 6, which is utilized when it is desirable to process interrogations from two separate central ground stations, includes circuits similar to those of Box II, i.e., NAND gates $16'_x$, $16'_y$ and $16'_s$, and preset counters-by-N $18'_x$ and $18'_y$.

One input of each of gates $16'_x$, $16'_y$ and $16'_s$ is connected to lead 32, and the other ones are respectively connected to outputs Q of $15_x$, $15_y$ and $15_s$ in Box II via leads $27_x$, $27_y$ and $27_s$.

Outputs of $16_x$, $16_y$ and $16_s$ are respectively connected to leads $26_x$, $26_y$ and $26_s$.

Finally, via leads $28_x$, $28_y$ and $28_s$, respectively, the outputs of counters $18'_x$ and $18'_y$ and the output of gate $16'_s$ are connected to second NAND gates $21_x$, $21_y$ and $21_s$, Box II.

Further detail regarding operation of circuits of Box IV will be omitted in view of the similarity to corresponding circuits of Box II.

Box V of FIG. 6 illustrates an example of an encoder which produces replies after occurrence of encoding authorization pulses from leads $21_x$, $21_y$, or $21_s$ from Box II.

Assumption will be made that coded replies to interrogations $M_x$ or $M_y$ comprise two frame pulses $F_1$, $F_2$ with zero to four pulse encoded pulse combinations therebetween, defining 16 binary numbers, one of which characterizing the transponder code number.

Reply to interrogation $M_s$ comprises two pulses, one contemporaneous with $F_1$ and the other $F_3$ beyond $F_2$.

Data for replying to interrogations $M_x$, $M_y$ and $M_s$ are stored in binary code form in memories $34_x$, $34_y$ and $34_s$, each of which has seven outputs.

The three outputs having the same rank from memories $34_x$, $34_y$ and $34_s$ are connected to the three inputs of NAND gates 35-1, 35-2, . . . , 35-7.

Outputs of gates 35-1–35-7 are connected to set inputs p of the seven stages of a shift register 36. Clock pulses are applied to register 36 via inputs H connected together to lead 14 from Box I. Reset inputs C of register 36 are connected to lead 24 from Box II.

The output of 36 is connected to the first input of two-input AND gate 37 having its second input connected to lead 14' from Box I. The output of 37 is connected to the input of coded reply transmitter 38.

The encoding circuits of Box V operates as follows:

When an encoding authorization pulse is produced on lead $21_s$, for example, the contents of memory $34_s$ are transferred to outputs thereof; i.e., for that case, condition 1 goes to the first and seventh outputs and condition 0 to the five other outputs. Therefore, inputs p of the first and seventh stages of 36 are in condition 0. When, at time $t_a$, the leading edge of the first pulse of period $k\theta_a$ is applied to inputs H of 36, condition 1, characterizing the first pulse $F_1$ of the reply is applied from 37 to the input of transmitter 38 as long as gate 37 is on, that is, as long as condition 1 from lead 14' from output $P_2$ of divider 13, Box I, is operative.

The width of reply pulse $F_1$ is thus well defined by the duration of the on-condition of 37, i.e., by time interval $\theta_a$ between condition changes of outputs $\overline{Q}_1$ and $\overline{Q}_2$ of divider 13, Box I.

The conditions of register 36 are then shifted to the output by successive occurrences of leading edges of pulses at period $k\theta_a$. When the seventh edge occurs, the second pulse $F_3$ is produced at the input of 38.

It is to be noted that, for the three types of replies, the output stage of 36 has its input p in condition 0. Thus, gate 35-1 and the first three outputs of the three memories 34 may be advantageously suppressed. Then output p of the output stage of 36 is connected to inputs C of the other stages and automatically reset to 0 via lead 24 from output $\overline{Q}$ of monostable flip-flop 23, Box II, a short time after the end of the coded reply transmission.

Figure 7:
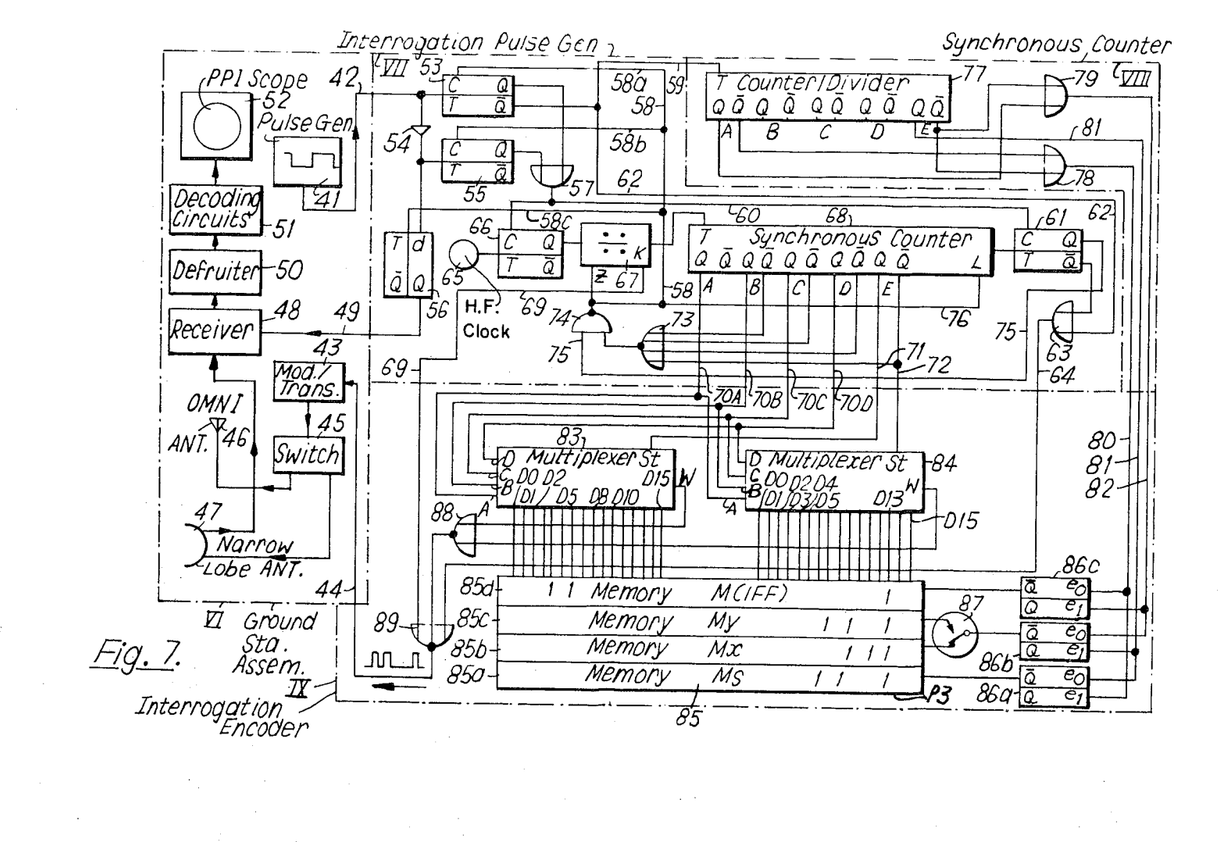
FIG. 7 is a schematic diagram of an interrogator according to this invention, associated with a secondary radar ground station installation.

FIG. 7 basically illustrates an embodiment of an interrogator according to this invention; however, to make it easier to understand, a very brief diagram of a secondary radar ground station assembly will be described.

FIG. 7 includes four boxes.

Box VI is a schematic diagram of the ground station assembly.

Box VII includes circuits for generating interrogation pulses, circuits introducing a delay between associated primary radar synchronization pulses of period $T_s$ and pulse $P_3$ of interrogations, and finally circuits for opening a reception strobe pulse during time $T_s/2$ following transmission of $P_3$.

Box VIII illustrates a synchronous counter-by-N + 2 which counts the synchronization pulses of period $T_s$ from trailing edges of synchronization pulses.

Box IX illustrates an interrogation encoder.

In Box VI of FIG. 7, a generator 41 delivers synchronization square pulses of period $T_s$, which are also used for controlling the primary radar, and these are connected via lead 42 to the input of Box VII. A modulator-transmitter 43 receives via lead 44 from Box IX interrogation pulses. A UHF signal, after having been modulated by interrogation pulses, is sent via a switching device 45 for suppressing secondary lobes to an omnidirectional antenna 46 which radiates pulses $P_2$ and to a rotatable narrow-lobe antenna 47 which radiates interrogations $P_1$ and $P_3$.

Antenna 47 operates in a duplex mode and receives transponder replies which are sent into a receiver 48 provided with a reception strobe pulse whose on-condition is controlled by signals from Box VII, via lead 49. A defruiter 50 sorts the replies and eliminates those which are not synchronized and, for instance, may be replies to other interrogators. More or less complex, but well known in the art, decoding circuits 51 permit representation on a PPI scope 52, blips which characterize and identify mobile targets under secondary radar surveyance.

Before further describing FIG. 7, some typical parameter assumptions will be made, as follows:

$\theta_i = 1$ microsecond,
N = 16
M = 1
$\delta$ = 30 microseconds
$T_a$ = 23 microseconds In addition, assumption will be made that the leading edge of synchronization pulses, having a period $T_s$ equal to 266 microseconds, is synchronized with pulses $T_s$ from the primary radar.

For such conditions, $T_r = T_s/2 - (\delta + T_a) = 80$ microseconds, and the duration of a cycle comprising (N + 2) interrogations is 4.8 milliseconds.

In Box VII of FIG. 7, lead 42 from Box VI is connected, on the one hand, to input T of flip-flop 53 provided with an input C and, on the other hand, to the input of an inverter 54.

The output of 54 is connected, on the one hand, to input T of flip-flop 55 and, on the other hand, to input d of flip-flop 56 whose output Q controls via lead 49, the on-off condition of reception strobe pulse of receiver 48, Box VI.

Outputs Q from flip-flops 53 and 55 are respectively connected to two inputs of an OR gate 57.

Lead 58 has its branches 58a and 58b connected to inputs C of flip-flops 53 and 55, and via its branch 58c to input T of flip-flop 56.

Output of 57 is connected to input C of flip-flop 61, via lead 60. Lead 62 from output $\overline{Q}$ of 53 and the output $\overline{Q}$ of 61 are respectively connected to the two inputs of OR gate 63. The output of 63 is connected to lead 64 entering Box IX. Lead 59 from output $\overline{Q}$ of 53 enters Box VIII.

High frequency clock 65, having, for instance, a frequency of 20 MHz, delivers pulses of period 50 ns to the input of flip-flop 66 provided with an input C connected to the output of 57 and which operates as a divider-by-two. Output Q of 66 is connected to the input of divider 67 of the "Johnson Counter" (for example) provided with an input Z and having a division ratio equal to one-tenth in the described embodiment. From the output of 67, when the divider assembly including 66 and 67 is operating, signals are thus pulses having a width of 1 microsecond ($\theta_i = 1$ microsecond).

The output of 67 is connected to inputs T of a synchronous counter-by-R 68. On the other hand, divider 67 is provided with an output K connected to Box IX via lead 69.

For convenience purposes, counter 68 is a simple binary counter, that is, R is equal to a power of 2. In addition, 68 is provided with a preset input L. By way of example, if required delay $T_r$ is 80 microseconds corresponding to counting 80 pulses of 1 microsecond each, the preset value will be 48 if R is selected equal to 128.

The five outputs Q of 68, corresponding to the five first stages A, B, C, D and E, and output $\overline{Q}$ of stage E are respectively connected to six leads 70A, 70B, 70C, 70D, 71 and 72 toward Box IX.

The four outputs $\overline{Q}$ of 68 corresponding to stages B, C, D, E, are connected to four inputs of NOR gate 73 whose output is connected to one input of the two-input NAND gate 74, the other input of 74 being connected to output Q of 61 via lead 75. The output of 74 is connected, on the one hand, to input Z of divider 67 and, on the other hand, to lead 58 and, finally, to input L of counter 68 via lead 76.

In Box VII, circuits operate as follows:

Assumption is made that when the leading edge of a synchronization pulse of period $T_s$ occurs on lead 42, inputs C of flip-flops 53 and 55 will be in the 1 condition, but only 53 may be switched since condition change at input T is from 0 to 1. OR gate 57 is turned on, flip-flop 66 is turned on and pulses from clock 65 are divided by 20 in assembly 66–67.

One-microsecond pulses are counted in 68 from the preset binary number (i.e., 48) until 80 pulses have been counted from triggering of counter 68. All the outputs Q of 68 are turned to the O condition and, in particular, those which control switching of 61 whose output Q is turned to the 1 condition. Such a condition is transferred to one of the two inputs of NAND gate 74 via lead 75. At that time, output of NOR gate 73 is in the 0 condition, since its four inputs are all in the 1 condition, and OR gate 63 is turned off since its two outputs are in the 0 condition. Level 0 is transmitted, via lead 64, to Box IX, thus allowing production of interrogation pulses.

Pulses occur in sequence at the input of 68, and conditions of flip-flops 53, 55, 56 and 61 are not changed up to occurrence of the 110th pulse. At that time, outputs $\overline{Q}$ of the four stages B, C, D and E of 68 are in the 0 condition, and NOR gate 73 is turned on.

The two inputs of 74 are in the 1 condition causing its output to turn to 0. Divider 67 is reset. Via lead 76, reset of input L of counter 68 restores the initial preset value (i.e., 48). Finally, via leads 58, 58a and 58b, the two flip-flops 53 and 55 are restored to 0, OR gate 57 is turned off, output Q of 66 is turned to 0, and via lead 60, such a value 0 is transmitted to input C of flip-flop 61 whose output Q is restored to 0. OR gate 63 is turned on, since via lead 62, value 1 from output $\overline{Q}$ of 53 is transferred to one input of 63. Therefore, as it will be hereafter described Box IX can produce no interrogation.

It will be noted that, in flip-flop 56, a change from 1 to 0 applied via lead 58c to input T turns output Q to 1, such a condition 1 being used, via lead 49, to turn on the reception strobe pulse of receiver 48, Box VI.

When the leading edge of synchronization pulse occurs via lead 42, output Q of flip-flop 55 is turned to 1, and gate 57 is turned on. At the same time, 0 condition is applied to input d of flip-flop 56.

As gate 57 is on, flip-flop 66 is turned on, and the previously described operation of counter 68 and circuits associated therewith runs again. But as gate 63 is on with its output at 1, there is no interrogation transmission from Box IX. When counting of 110 pulses is ended, the output of 74 is turned from 1 to 0. Lead 58 transmits 0 to input Z of divider 67 and to inputs C of flip-flops 53 and 55 which are turned off causing 57 to turn off. Output Q of 61 is turned to 0, but OR gate 63 is still on since one of its two inputs is at level 1. Change from 1 to 0 at input T of flip-flop 56, whose input d is at 0, causes output Q to deliver signal 0 with the result that, via lead 49, the reception strobe pulse of receiver 48 is turned off (Box VI).

Via lead 76, condition 0 is also applied to input L of counter 68 wherein preset value 48 is restored.

No further change occurs up to occurrence on 42 of the next trailing edge of synchronization pulse of period $T_s$. A sequence of the hereabove-described operations happens again, and when counting of 80 pulses in counter 68 has been completed, flip-flop 61 turns its condition, OR gate 63 is turned off, and level 0 is transmitted via lead 64 to Box IX. Thus, it is again possible to produce interrogation pulses.

When the 110th pulse has been counted in 68, NAND gate 74 is turned off which causes flip-flop 56, having its input d at level 1, to change its condition. Output Q of 56 is turned to 1, and reception strobe pulse of 48, Box VI, is again turned on.

Briefly, due to flip-flop 56 operating as a divider by two, the strobe pulse is on during the time duration $T_s/2$ which follows transmission of interrogation pulse $P_3$ and then is off during the same time duration $T_s/2$ up to the occurrence of the next interrogation pulse $P_3$.

Similarly, flip-flop 61, which has a reset input C as well as OR gate 63, authorize reply transmission only during the time elapsed between counting of the 80th pulse and that of the 110th; that is, up to transmission time of interrogation pulse $P_3$, provided, however, that counting has been triggered by a condition change of 53 due to occurrence at its input of a trailing edge of a synchronization pulse of period $T_s$ but not due to a condition change of 55 when the leading edge thereof is applied to its input.

It is also noted that data carried by output leads 70A–70D, 71 and 72, which are applied to interrogation encoding Box IX, describe in binary code the rank number of occurrence for pulses of 1 microsecond.

Finally, turning on or off of the reception strobe pulse in 48, Box VI, requires use of flip-flops 55 and 56 and gates 54 and 57. Reversely, even if there was no such a need, flip-flop 61 and OR gate 63 are needed in order to authorize interrogation pulse transmission only when counting between the 80th and the 110th pulse after the particular trailing edge of synchronization pulse of period $T_s$ has been applied to input of 53.

Box VIII of FIG. 7, contains 77 which is basically a synchronous counter-divider-by-N + 2 having an input T to which are applied, via lead 59, trailing edges of pulses from output $\overline{Q}$ of flip-flop 53 of Box VII.

In the described example, N + 2 = 18 and counter 77 thus has five stages A – E.

Within the sequence of 18 stored binary numbers, it is to be noted that 16 binary numbers are characterized by output $Q_E$ in condition 0. Then also there are numbers 10000 and 10001.

Outputs $\overline{Q_E}$ and $\overline{Q_A}$ are applied to two inputs of OR gate 78 which is off when number 10001 is stored in counter 77. During counting of 16 pulses of period $T_s$ it remains at level 0.

Outputs $\overline{Q_E}$ and $Q_A$ are applied to two inputs of OR gate 79 which is off when the 17th pulse occurs after having counted 16 preceding pulses.

Initially, the output of 78 is turned to 0 corresponding to interrogation of synchronization mode $M_s$ and is connected to Box IX, via lead 80.

Then, during 16 pulses of period $T_s$, output $Q_E$ remains at level 0 while the output of 78 is turned to condition 1. Output $Q_E$ corresponds to 16 interrogations of modes $M_x$ or $M_y$. Lead 81 is connected from output $Q_E$ to Box IX. Finally, at the 18th pulse, the output of 79 in turn is turned to condition 0, the output of 78 and the output $Q_E$ being then in condition 1. The output of 79 corresponds to an additional interrogation of conventional mode (for example: IFF mode) and is connected to Box IX via lead 82.

Box IX of FIG. 7 shows the interrogation encoding box basically including two cascaded multiplexers 83 and 84, each having four binary selection inputs A, B, C, and D which are respectively connected to leads 70A, 70B, 70C and 70D from Box VII.

Multiplexers 83 and 84 are each provided with sixteen data storage inputs which are denoted $D_0$–$D_{15}$ and with an inhibition input St. Inputs St are respectively connected leads 70 and 72 from Box VII.

The 32 outputs of assembly 85 including four memories 85a, 85b, 85c and 85d, each corresponding to one of the four interrogation modes $M_s$, $M_x$, $M_y$ and M (IFF) and each storing the corresponding interrogation code in the form of a 32-bit binary number, are connected to the 32 data storage inputs of multiplexers 83 and 84. Pulse $P_3$ having, for the four interrogation modes, the same position with respect to a synchronization pulse of period $T_s$, the stage of the same rank in the four memories will store the same bit, either 0 or 1, which characterizes the generation of that pulse.

Inputs $e_1$ of three S-R flip-flops 86a, 86b and 86c are respectively connected to leads 80, 81 and 82 from Box VIII.

Inputs $e_2$ of 86a, 86b and 86c are respectively connected to leads 81, 82, and 80.

A manual or electronic control switch 87 enables output $\overline{Q}$ of 86b to be connected either to the input of memory 85b or to that of 85c. Outputs $\overline{Q}$ of 86a and 86c are respectively connected to transfer inputs of memories 85a and 85d.

Assembly 86a, 86b, 86c operates as a counter-by-three and a selector for memories 85a, 85b, 85c and finally 85d.

Outputs W of multiplexers 83 and 84 are connected to the two inputs of NOR gate 88.

The output of 88 is connected to one input of the three-input NOR gate 89 having its two other inputs respectively connected to leads 64 and 69 from Box VII.

The circuits of Box IX operate as follows.

When output $\overline{Q}$ of 86a is turned from 1 to 0, the pulses applied to transfer input of memory 85a transfers to the 32 data storage inputs of 83 and 84 the positions of the three interrogation pulses of mode $M_s$, (i.e., digit 0, the 29 other data storage inputs corresponding to lack of pulses having digit 1).

When pulses are counted at inputs A, B, C, D of 83 and 84 and when inputs $St$ are respectively at levels 0 and 1, digit 1 appears from output W of 83 each time number A, B, C, D selects an input $D_0$–$D_{15}$ of 83 at level 0. If the memory 85d corresponding to the mode IFF (called also mode D) has been selected by assembly 86a – 86c, that operation is occurring for inputs $D_4$ and $D_6$ of 83, respectively, corresponding to pulses $P_1$ and $P_2$ of the said mode. For those conditions, NOR gate 88 is off, and 0 is applied to one input of NOR gate 89.

When inputs $St$ of multiplexers 83 and 84 are respectively at level 1 and 0, digit 1 appears from output W of 84 each time number A, B, C, D selects an input $D_0$–$D_{15}$ of 84 at level 0. If the memory 85d for the IFF mode has been selected that occurs for input $D_{13}$ of 84 corresponding to pulse $P_3$ of mode IFF.

In the case of selection of interrogation memory for mode $M_s$ by means of flip-flop 86a, as long as input St of 83 remains at level 0, output W of 83 remains in condition 0 since no input $D_0$–$D_{15}$ is at level 0, and output W of 84 is also in condition 0 since its input $St$ is at level 1 and NOR gate 88 is on.

Reversely, when there is switching of level on inputs $St$ of 83 and 84, output W of 84 is turned to 1 when binary number A, B, C, D selects data storage inputs $D_6$, $D_8$ and $D_{13}$ of 84, all three being at level 0 and respectively corresponding to pulse $P_1$, $P_2$, $P_3$ of mode $M_s$. Thus, in those three cases, a 0 is applied to one input of NOR gate 89.

A similar type of operation applies to mode $M_x$ or mode $M_y$ depending on the position of switch 87.

That switch may be manually controlled or, according to known processes, by counting pulses of period $(N + 2) T_s$ from counter 77, Box VIII, switching from $M_x$ to $M_y$ may be performed, for example, for every period $(N + 2) T_s$, or every two periods, etc.

Now going back to gate 89, it will be noted that it is on as long as its three inputs are at level 0. That condition requires that the output of gate 63, Box VII, transmits via lead 64 the value 0 (otherwise said, that pulses which are counted in counter 68, box VII, are really those which are delayed by $T_a$ after occurrence of trailing edge of synchronization pulse of period $T_s$ at output $\overline{Q}$ of 53, box VII), that one of the data storage inputs of multiplexers 83 or 84 is at level 0 and, finally, that level 0 be applied from box VII via lead 69. That last condition means that gate 89 will be off at the end of the time interval which is a multiple of the period of clock 65 (in the described embodiment, a multiple of 50 nanoseconds), said multiple lasting from the change from 1 to 0 of the output of divider 67 to the change from 0 to 1 of an output K, suitably selected in divider 67. Thus, the interrogation pulse width is well defined.

Finally, these pulses ($P_1$, $P_2$, $P_3$), which characterize the selected mode, will successively appear from the output of 89 and will be used to modulate transmitter 43, box VI, via lead 44.

Utilization of the two multiplexers 83 and 84 will be again considered. Those two multiplexers have been cascaded in order to use commercially available circuits. Indeed, a simpler circuit arrangement including a single multiplexer having five binary selection inputs A, B, C, D, E and 32 data storage inputs could be used. The input $St$ would then be connected to output of counter 68, Box VII.

While the principles of the present invention have been hereabove described in relation with a specific embodiment, it will be clearly understood that the said description has only been made by way of example and is not intended to limit the scope of this invention. The drawings and this description are to be regarded as illustrative and typical only.

What is claimed is:

1. A secondary radar system, operable in synchronizing with a ground primary radar, for target identification, including ground interrogation and receiving equipment and an airborne transponder beacon for each identifiable aircraft, comprising the combination of:

first means within said ground equipment for cyclically transmitting signal sequences, each sequence beginning with synchronization pulses, and thereafter changing to a first digital interrogation code;

second means within a transponder equipped aircraft for receiving said interrogation pulses and for initiating a synchronous event timing cycle in response to said synchronizing pulses of said signal sequences and for decoding said digital interrogation code;

third means including a plurality of memories each storing a predetermined reply code each representative of discrete information to be selectively provided from said ground station to an aircraft;

fourth means responsive to the decoded interrogation provided by said second means to select a discrete reply code from the memories of said third means;

and fifth means responsive to said second means for programming the transmission of said selected reply code to said ground station at a time in accordance with the time of reception of the corresponding ground interrogation code received by said second means from each ground transmitter interrogating said aircraft.

2. A secondary radar system for target identification comprising:

a central ground station which transmits coded interrogations synchronous with the pulses of an associated primary radar, said pulses being of period $T_s$ and which includes a receiver and a decoder for received replies to its interrogations, the said interrogations comprising at least two pulses $P_1$ and $P_3$ which enclose a plurality of pulses, the number of those pulses and their time intervals defining predetermined interrogation modes;

a plurality of transponders, each associated with a target to be identified and comprising means for decoding interrogations to recognize said interrogation mode and for transmitting predetermined replies starting with a predetermined delay $t_a$ after reception of pulse $P_3$ of an interrogation according to one of said modes;

first means within said ground station for cyclically transmitting sequences of $(1 + N)$ interrogations whose pulses $P_3$ are spaced from each other by time interval $T_s$, the first interrogation being for synchronization, the N following interrogations being those of one of a plurality of predetermined modes used for identifying the S targets;

said first means including (1 + C) encoding memories, each storing digits of the binary number which characterizes each of the (1 + C) coded interrogations;

a plurality of devices for primary selection of encoding memories, controlled by a synchronous counter which counts synchronization pulses of period $T_s$, to select synchronization interrogation mode memory and interrogation of one of the C modes and operating during a time duration $NT_s$;

and a code pulse generator of period $\theta_i$ which synchronizes operation of an encoder whose output delivers at time intervals multiple of $\theta_i$, the pulses of the coded interrogation stored in the selected memory, said predetermined advance being such that pulse $P_3$ is transmitted at a predetermined time $T_a$ with respect to said synchronization pulse of period $T_s$.

3. Apparatus according to claim 2 in which said first means includes sequence generating means for transmitting (1 + N + M) sequences, where M is an additional interrogation sequence differing from that provided by the corresponding N sequence, said ground station is defined as producing (1 + C + M) codes, comprising said coded interrogations, and including (2 + M) devices for said primary selection of encoding memories, whereby said M interrogations operate to select from M memories containing standard interrogation codes for further recognition security.

4. Apparatus according to claim 3 wherein each transponder, corresponding to one of said targets, includes decoding means for discretely recognizing said synchronization interrogations and those of each of the C identification modes and means for generating recognition pulses and applying them to a corresponding one of (1 + C) time-separated reply channels.

* * * * *